United States Patent
Ma et al.

(10) Patent No.: US 11,148,102 B2
(45) Date of Patent: Oct. 19, 2021

(54) THIN FILM COMPOSITE MEMBRANE WITH NANO-SIZED BUBBLES HAVING ENHANCED MEMBRANE PERMEABILITY, PREPARATION METHODS AND USES THEREOF

(71) Applicant: THE UNIVERSITY OF HONG KONG, Hong Kong (CN)

(72) Inventors: Xiaohua Ma, Hong Kong (CN); Chuyang Tang, Hong Kong (CN)

(73) Assignee: THE UNIVERSITY OF HONG KONG, Hong Kong (CN)

( * ) Notice: Subject to any disclaimer, the term of this patent is extended or adjusted under 35 U.S.C. 154(b) by 32 days.

(21) Appl. No.: 16/606,587

(22) PCT Filed: Apr. 19, 2018

(86) PCT No.: PCT/CN2018/083723
§ 371 (c)(1),
(2) Date: Oct. 18, 2019

(87) PCT Pub. No.: WO2018/192549
PCT Pub. Date: Oct. 25, 2018

(65) Prior Publication Data
US 2020/0129931 A1    Apr. 30, 2020

Related U.S. Application Data

(60) Provisional application No. 62/487,218, filed on Apr. 19, 2017.

(51) Int. Cl.
*B01D 69/12* (2006.01)
*B01D 67/00* (2006.01)
(Continued)

(52) U.S. Cl.
CPC ......... *B01D 69/125* (2013.01); *B01D 67/003* (2013.01); *B01D 67/0013* (2013.01);
(Continued)

(58) Field of Classification Search
CPC   B01D 69/125; B01D 67/0013; B01D 67/003; B01D 69/10; B01D 71/024;
(Continued)

(56) References Cited

U.S. PATENT DOCUMENTS

2001/0050252 A1   12/2001   Mickols

FOREIGN PATENT DOCUMENTS

CN    104667759 A    6/2015
CN    106512729 A    3/2017

OTHER PUBLICATIONS

International Search Report and Written Opinion in corresponding PCT Application No. PCT/CN2018/083723, dated Jun. 15, 2018.
(Continued)

*Primary Examiner* — Krishnan S Menon
(74) *Attorney, Agent, or Firm* — Leason Ellis LLP

(57) ABSTRACT

Thin film composite membrane with nano-sized bubbles having enhanced membrane permeability, preparation methods and uses thereof are provided. The method of preparation of a thin film composite membrane, comprising: a) an aqueous solution containing at least an amine, and b) an organic solution containing at least a polyfunctional acyl halide, an additive or soluble gas being present in a) and/or b), or a nano-bubble generator or ultrasound are used to generate nano-bubbles in a) and/or b). Interfacial polymerization of a) and b) occurs at or near the surface of a porous support membrane. The advantage of creating nano-sized bubbles in the separating layer of membrane is that it can reduce membrane resistance without sacrificing the mechanical strength and stability of the membrane so as to
(Continued)

improve its water permeability, salt rejection and antifouling. In addition, the process is simple to adopt while performance improvement of the membrane is remarkable.

14 Claims, 3 Drawing Sheets

(51) Int. Cl.
    *B01D 69/10*     (2006.01)
    *B01D 71/02*     (2006.01)
    *B01D 71/56*     (2006.01)
    *B01D 71/68*     (2006.01)
    *B01D 69/02*     (2006.01)

(52) U.S. Cl.
    CPC ........... *B01D 69/10* (2013.01); *B01D 71/024* (2013.01); *B01D 71/56* (2013.01); *B01D 71/68* (2013.01); *B01D 69/02* (2013.01); *B01D 2323/40* (2013.01); *B01D 2323/48* (2013.01); *B01D 2325/02* (2013.01)

(58) Field of Classification Search
    CPC ........ B01D 71/56; B01D 71/68; B01D 69/02; B01D 2323/40; B01D 2323/48; B01D 2325/02; B01D 67/0006
    See application file for complete search history.

(56) References Cited

OTHER PUBLICATIONS

Xiao-Hua Ma et. al, "Nanofoaming of Polyamide Desalination Membranes to Tune Permeability and Selectivity", Environ. Sci. Technol. Lett.,No. 5, Feb. 1, 2018 (Feb. 1, 2018), pp. 123-130.
M. Elimelech, W.A. Phillip, "The future of seawater desalination: energy, technology, and the environment," Science, 333 (2011) 712-717.
K.P. Lee, T.C. Arnot, D. Mattia, "A review of reverse osmosis membrane materials for desalination—Development to date and future potential," Journal of Membrane Science, 370 (2011) 1-22.
D. Li, H. Wang, "Recent developments in reverse osmosis desalination membranes," Journal of Materials Chemistry, 20 (2010) 4551.
B.J.A. Tarboush, D. Rana, T. Matsuura, H.A. Arafat, R.M. Narbaitz, "Preparation of thin-film-composite polyamide membranes for desalination using novel hydrophilic surface modifying macromolecules," Journal of Membrane Science, 325 (2008) 166-175.

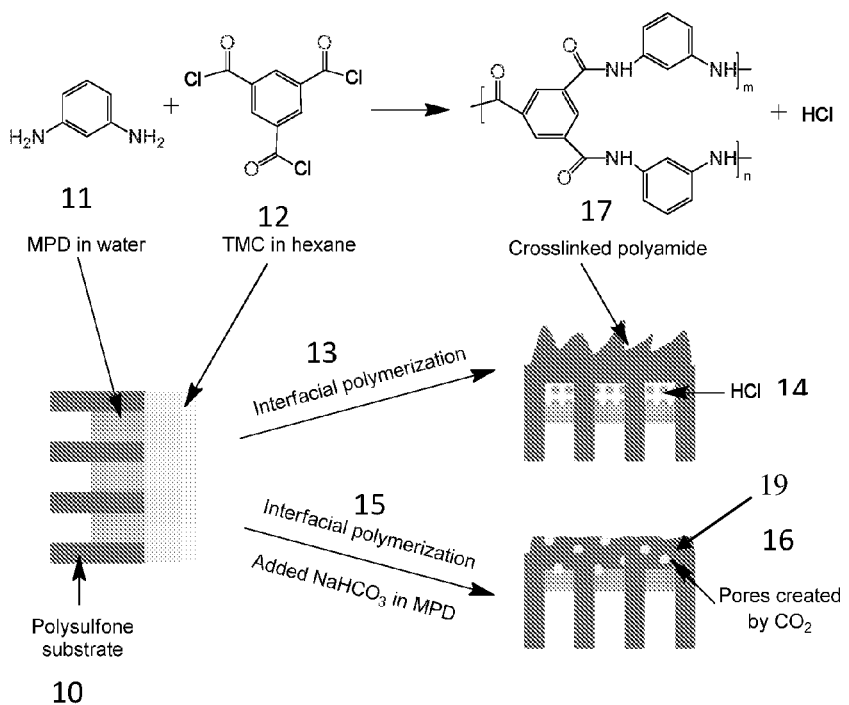
FIG. 1
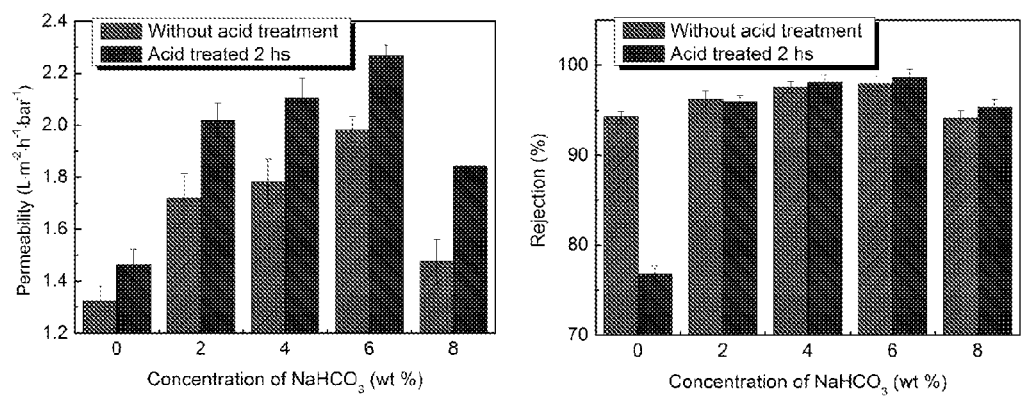
FIG. 2A  FIG. 2B

Fig. 5A
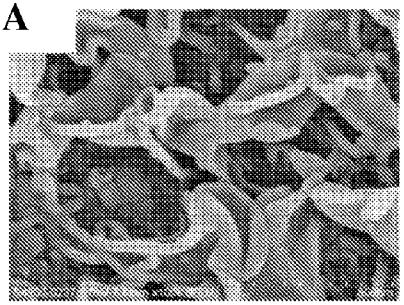
Fig. 5C
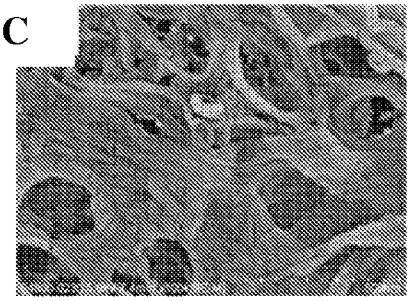
Fig. 5B
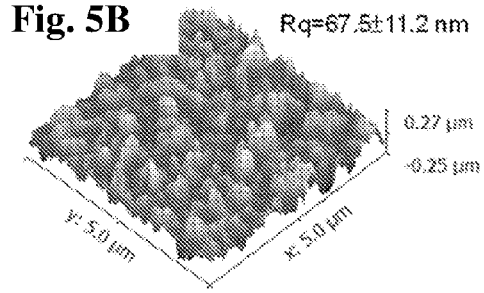
Fig. 5D
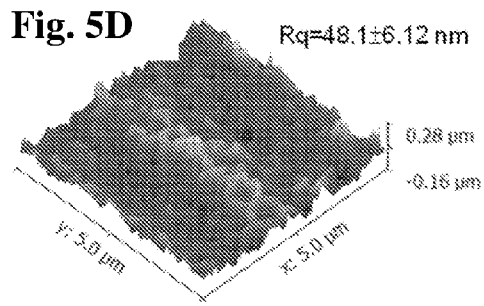
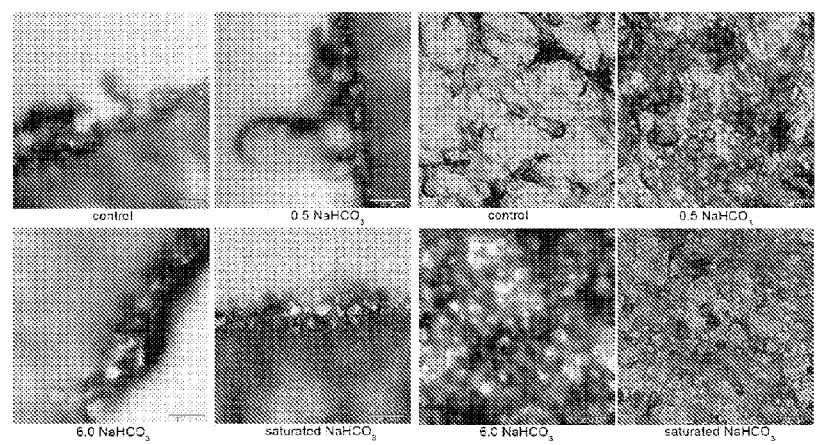
FIG. 6A  FIG. 6B

THIN FILM COMPOSITE MEMBRANE WITH NANO-SIZED BUBBLES HAVING ENHANCED MEMBRANE PERMEABILITY, PREPARATION METHODS AND USES THEREOF

CROSS-REFERENCE TO RELATED PATENT APPLICATIONS

This application is a U.S. National Phase Application under 35 U.S.C. § 371 of International Patent Application No. PCT/CN2018/083723, filed Apr. 19, 2018 and claims the benefit of priority under 35 U.S.C. Section 119(e) of U.S. application Ser. No. 62/487,218, filed Apr. 19, 2017; which are incorporated herein by reference in their entireties. The International Application was published in English on Oct. 25, 2018 as International Publication No. WO/2018/192549 A1.

FIELD OF THE INVENTION

The present invention relates generally to membranes and, more particularly, to thin film composite membranes having enhanced membrane permeability, preparation methods and uses thereof.

BACKGROUND OF THE INVENTION

Reverse osmosis is a water purification technology in which water with unwanted constituents is passed through a semipermeable membrane under certain applied pressure to remove ions, particles and molecules from it. It is currently the most important desalination technology for alleviating the stresses on water scarcity—one of the most serious global challenges of our time. See, M. Elimelech, W. A. Phillip, "The future of seawater desalination: energy, technology, and the environment," Science, 333 (2011) 712-717 (hereinafter "Elimelech"). Up until now, the most popular commercial reverse osmosis membranes are polyamide thin film composite membranes. See the Elimelech article as well as K. P. Lee, T. C. Arnot, D. Mattia, "A review of reverse osmosis membrane materials for desalination—Development to date and future potential," Journal of Membrane Science, 370 (2011) 1-22 (herein after "Lee") and D. Li, H. Wang, "Recent developments in reverse osmosis desalination membranes," Journal of Materials Chemistry, 20 (2010) 4551. One of the major advantages of thin film composite membranes is the ability to separately optimize the thin film and the porous substrate, which endows the overall thin film membrane with adjustable membrane structure, high separation performance and membrane stability. B. J. A. Tarboush, D. Rana, T. Matsuura, H. A. Arafat, R. M. Narbaitz, "Preparation of thin-film-composite polyamide membranes for desalination using novel hydrophilic surface modifying macromolecules," Journal of Membrane Science, 325 (2008) 166-175. This is because the thin film composite membranes are generally fabricated via interfacial polymerization of an aqueous solution comprising at least an amine monomer and an organic solution comprising at least an acid chloride monomer at or near a porous substrate, typically polysulfone porous substrate.

Since the revolutionary success of the introduction of thin film composite membranes into the commercial market, research and development towards new thin film composite membranes has declined dramatically. Current commercial thin film composite membrane products are still based on the original chemistry discovered during the 1980s and monopolized by Dow Filmtec, Hydranautics, Toray, Vontron and GE etc. For example, the biggest manufacturers of desalination membranes, Dow Filmtec®, currently sells products based on FT-30; membranes supplied by Toray, which are based on UTC-70; Hydranautics membranes are based on NCM1, which is identical to CPA2; and Trisep membranes are based on X-20. On the other hand, asymmetric membrane products are still based on the conventional cellulose acetate materials (Toyobo Hollosep®) See the Lee article.

Although existing thin film composite membranes are effective and commercial, they still suffer drawbacks such as low water permeability and susceptibility to fouling. Many methods have been employed to increase the water permeability and could be classified into two types. On one hand, the interfacial polymerization reaction is controlled by including an additive such as an amine salt (especially, tertiary monomeric amine salt, quaternary monomeric amine salt, a polyfunctional tertiary amine salt), alcohol and the like (a polar aprotic solvent), or nanoparticle (e.g., zeolite, $TiO_2$) to the reaction system. On the other hand, the prepared thin film composite membrane is subjected to post-treatment. However, neither of the above-described two methods enhances both the water permeability and salt rejection to desired extents.

The purpose of the present invention is to provide a thin film composite membrane having enhanced membrane permeability and offer fabrication methods and uses thereof.

SUMMARY OF THE INVENTION

The present invention relates to the concept of creating nano-sized bubbles in the separating layer of the membrane as well as additives and methods to achieve the purpose. Specifically, the present invention relates to thin film composite membranes having enhanced membrane permeability, preparation methods and uses thereof. The invention utilizes:

1) An aqueous solution containing at least an amine,
2) An organic solution containing at least a polyfunctional acyl halide,
3) An additive (e.g., salts of bicarbonate, carbonate, CuO nano-powder/nano-particles, pure metals (e.g., zero valent iron)), or soluble gas (e.g., $N_2$, $CO_2$, $O_2$, $SO_2$, $H_2$, $CH_4$, $H_2S$, chlorine, ammonia, and vapor of volatile organic solvents) is present in (1) or (2), and/or
4) A nano-bubble generator or ultrasound used to generate nano-sized bubbles in (1) or (2).

The nano-sized bubbles in thin film are generated by interfacial polymerization or by post-treatment to enhance the membrane permeability.

The method of fabricating thin film composite membranes according to the present invention involves the steps of: 1) adding a certain amount of additive (e.g., salts of bicarbonate, carbonate, CuO nano-powder/nanoparticles, pure metals (e.g., zero valent iron)) into an aqueous solution of m-phenylenediamine (MPD, $C_6H_4(NH_2)_2$), preferably, in the case of the additive being salts, the concentration of the additive in the MPD aqueous solution is in the range of 0.0 wt %-saturated concentration, and in the case of the additive being nano-powder/nanoparticles or pure metals, the concentration of the additive in the MPD aqueous solution is in the range of 0.0-10.0 wt %, or 2) pressuring soluble gas (e.g., $N_2$, $CO_2$, $O_2$, $SO_2$, $H_2$, $CH_4$, $H_2S$, chlorine, ammonia, and vapor of volatile organic solvents) into MPD aqueous solution at a pressure of 0-10 bar for 0-2 hours, and in some embodiments at a pressure of 0-10 bar for 10 seconds to 5 hours, and/or 3) using a nano-bubble generator, and/or 4) ultrasound (0<ultrasonic intensity<1 $W/cm^2$) to generate nano-sized bubble in MPD aqueous solution, preferably, the concentration of MPD in the MPD aqueous solution is in the range of 0.01~10.0 wt. %. The aqueous solution is poured on the top surface of the polysulfone substrate and allowed to soak for 10 seconds-5 hours. Afterwards, the excess MPD solution is carefully removed from the membrane surface by a gas knife or a rubber roller.

Then, a trimesoyl chloride (TMC, $C_9H_3Cl_3O_3$) hexane solution with a concentration of 0.0005-2.0 wt. % is gently poured onto the MPD-soaked membrane substrate and allowed to react for 5 seconds-30 min, which caused the formation of a thin film via interfacial polymerization. Afterwards, the hexane solution is drained and the membrane is heat treated for 0-30 min at 25-80 degrees centigrade or post-treated with acid for 0-48 hours.

Finally, the membrane is stored in deionized water for the performance testing.

Membrane fouling was evaluated using bovine serum albumin (BSA) as a model foulant. Most membranes will result in flux reduction because of BSA adsorption. The flux reduction can be recovered by cleaning with water. The invented membrane can keep the flux at a high level even with the presence of BSA aqueous solution.

The thin film composite membrane fabricated by the method of the present invention can be used in reverse osmosis (RO), nano-filtration (NF), forward osmosis (FO), pressure retarded osmosis (PRO), or chemical applications (e.g., batteries, fuel cells).

The additive (e.g. salts of bicarbonate, carbonate) used in the invention is cheap and abundant. The preparation method of the membrane is simple and effective. With only a small amount of additive, there is a remarkable improvement.

The advantage of creating nano-sized bubbles in the separating layer of membrane is that it can reduce membrane resistance without sacrificing the mechanical strength and stability of the membrane so as to improve its water permeability, salt rejection and antifouling. In addition, the additional cost of applying an additive during the process is very low, the process is simple to adopt while performance improvement of the membrane is remarkable.

BRIEF DESCRIPTION OF THE DRAWINGS

The foregoing and other objects and advantages of the present invention will become more apparent when considered in connection with the following detailed description and appended drawings in which like designations denote like elements in the various views, and wherein:

FIG. 1 is a schematic illustration of interfacial polymerization between m-phenylenediamine (MPD, $C_6H_4(NH_2)_2$) and trimesoyl chloride (TMC, $C_9H_3Cl_3O_3$) to form thin film composite membranes;

FIG. 2A and FIG. 2B show graphs of water permeability and salt rejection, respectively, of polyamide thin film composite reverse osmosis membranes prepared using various $NaHCO_3$ concentrations in 2.0 wt. % MPD aqueous solution tested at 16 bar and 25 degrees centigrade with a feed solution of 2000 ppm NaCl;

FIG. 5A is an SEM image of polyamide thin film composite reverse osmosis membranes without $NaHCO_3$ as additive; FIG. 5B is an AFM image thereof, FIG. 5C is an SEM image of polyamide thin film composite reverse osmosis membranes with $NaHCO_3$ as additive and FIG. 5D is an AFM image thereof; and FIG. 6A and FIG. 6B are a series of four cross-section and four top surface TEM images, respectively of a control film and polyamide thin film composite reverse osmosis membranes according to the present invention with different concentrations (0.5, 6.0 and saturated) of $NaHCO_3$ in MPD aqueous solution.

DETAILED DESCRIPTION OF ILLUSTRATIVE EMBODIMENTS OF THE INVENTION

Figure 3:
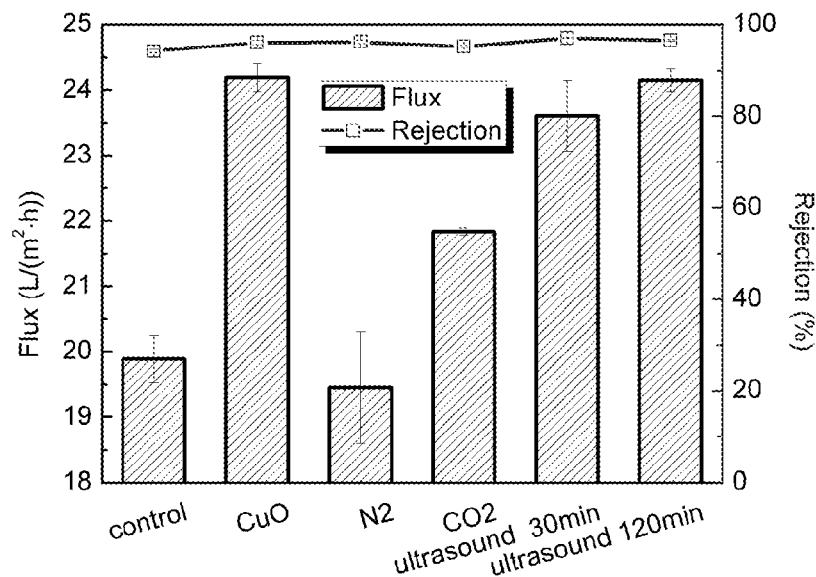
FIG. 3 is a bar chart showing water permeability and salt rejection of polyamide thin film composite reverse osmosis membranes prepared using CuO nanoparticles, $N_2$, and $CO_2$ in 2.0 wt. % MPD aqueous solution and ultrasound of 2.0 wt. % MPD aqueous solution tested at 16 bar and 25 degrees centigrade with feed solution of 2000 ppm NaCl.

The present invention is directed to the concept of creating nano-sized bubbles in the separating layer of a membrane for enhancing membrane permeability. The separating layer of a membrane includes, but is not limited to, thin film, active layer and separating skin layer, and in particular a thin film formed by interfacial polymerization. The nano-sized bubble includes, but is not limited to, nano-bubbles, nano-sized pores, nano-pores, nano-sized voids and nano-voids. These pores are created by including additives in the reaction system, introducing reactions to release gases, using solutions with supersaturated gases, pressuring soluble gases in the reaction system, altering temperature or pH to change the solubility of gases, applying ultrasonic vibrations to the reaction system and/or using a nano-bubble generator.

The additives include, but are not limited to, salts of bicarbonate, carbonate, CuO nano-powder/nano-particles, and pure metals (e.g., zero valent iron). The effect of the additives is to (1) decompose or react with at least one reactant or at least one product during reaction, or (2) be dislodged by post-treatment, or (3) release volatile vapor to generate nano-sized bubbles. The soluble gases include $N_2$, $CO_2$, $O_2$, $SO_2$, $H_2$, $CH_4$, $H_2S$, chlorine, ammonia, and vapor of volatile organic solvents.

The interfacial polymerization process for preparing thin film composite membrane comprises (a) an aqueous solution containing at least an amine, (b) an organic solution containing at least a polyfunctional acyl halide, and (c) wherein interfacial polymerization of a) and b) occurs at or near the surface of a porous support membrane (porous substrate). The porous support membrane includes, but is not limited to, polysulfone (PSf), polyethersulfone (PES), polyvinyl chloride (PVC), polyacrylonitrile (PAN), polycarbonate, polyphenylene oxides, poly(styrene-co-acrylonitrile), poly(phthalazinone ether sulfone ketone) (PPESK), polyetherimide, polypropylene and others by conventional phase inversion techniques. The membrane includes, but is not limited to, reverse osmosis (RO), nano-filtration (NF), forward osmosis (FO), pressure retarded osmosis (PRO), and chemical applications (e.g., batteries, fuel cells).

In an illustrative of the invention an additive to release nano-sized gas bubble is created for enhancing membrane permeability. In an example, an additive (e.g., salts of bicarbonate, carbonate) is present in a reaction system and acts to decompose or react with at least one reactant or at least one product during reaction to release nano-sized gas bubbles for generating nano-pores in a thin film formed by the reaction. An interfacial polymerization process for preparing thin film composite (TFC) membrane comprises the steps of:

(a) providing an aqueous solution containing at least an amine, (b) providing an organic solution containing at least a polyfunctional acyl halide, (c) providing an additive to (a) or (b), and (d) causing interfacial polymerization of a) and b) at or near the surface of a porous support membrane (porous substrate).

A porous support membrane can be prepared from a polymer solution. During the preparation of the polymer solution (e.g., PSf, PAN, PES, PVDF, PVC) certain amounts of polymer and additives are mixed in organic solvent (e.g., DMF, DMAc, NMP) in a sealed container at a certain temperature (preferably 50-90° C.) until homogenous. Then dope degassing is performed statically in the same container after cooling down to room temperature. The obtained polymer solutions are used for a Non-solvent Induced Phase Separation Process (NIPS) process. In the NIPS process, the casting solution is directly cast with a certain thickness onto a clean and smooth glass plate. The glass plate is immersed into the coagulation water bath quickly and smoothly. After the substrate is formed by phase inversion, excess solvent and additives were removed by soaking in deionized (DI) water before interfacial polymerization.

During the interfacial polymerization, a preformed membrane substrate is first poured with or soaked into an aqueous solution comprising at least an amine for 1-1200 seconds (preferably 30-600 seconds), following removal of the excess aqueous solution from the surface, and the preformed membrane substrate is then poured with or soaked into an organic solution comprising at least a polyfunctional acyl halide for 1-600 seconds (preferably 10-300 seconds) immediately. An additive (e.g., salts of bicarbonate, carbonate) is present in the aqueous solution or the organic solution with a concentration of 0.0-100% or 0.0-saturated solution. After the desired active layers had been formed, the membrane is heat treated or chemically treated according to the actual circumstances and needs, rinsed thoroughly with DI water, and stored in DI water at room temperature before characterization.

Example 1

In order to fabricate a substrate the following process was followed. A polymer solution with a concentration of 15.0 wt. %, was made from polysulfone (PSf) beads dissolved in N,N-Dimethylformamide (DMF) at 50° C. until homogeneous and transparent. This solution was used as casting solution to prepare a porous substrate. The casting solution was cooled down to room temperature and then degassed statically in the same container. Next, the casting solution was spread directly onto a smooth and clean glass plate. The glass plate with the whole composite was immediately immersed in deionized water as a coagulant bath at room temperature for at least 5 min to finish the phase inversion. The polysulfone substrate was then prepared and stored in deionized water.

In order to fabricate a thin film composite membrane, a certain amount of $NaHCO_3$ is added in a 1,3-phenylendiamine (MPD) aqueous solution with a concentration of 2.0 wt. %, wherein the concentration of $NaHCO_3$ in the MPD aqueous solution is 0.0, 2.0, 4.0, 6.0 or 8.0 wt % respectively. A schematic illustration of interfacial polymerization of MPD and TMC is shown in FIG. 1. The MPD aqueous solution with or without $NaHCO_3$ 11 was poured on the top surface of a polysulfone substrate 10 and allowed to soak for 2 min. Afterward, the excess MPD aqueous solution was carefully removed from the membrane surface by rolling it with a rubber roller. Then, a 1,3,5-benzenetricarbonyl trichloride (TMC) hexane solution 12 with a concentration of 0.2 wt. % was gently poured onto the MPD-soaked membrane substrate for 2 min. This caused the formation of a thin film via interfacial polymerization 13. Afterward, the hexane solution was drained and the membrane was put in warm water at 50° C. for 10 min and treated with HCl (pH=3.5) for 2 hours. Finally, the membrane is stored in deionized water pending a performance test.

As an alternative, $NaHCO_3$ can be used as an additive during Interfacial polymerization 15. Under the conditions that $NaHCO_3$ is added in the MPD aqueous solution and/or $NaHCO_3$ is added during interfacial polymerization, pores 16 are created in the film by $CO_2$.

Thus, FIG. 1 is a schematic illustration of interfacial polymerization between m-phenylenediamine (MPD, $C_6H_4(NH_2)_2$) and trimesoyl chloride (TMC, $C_9H_3Cl_3O_3$) to form thin film composite membranes. The structure 14 is a cross-linked polyamide thin film layer formed by interfacial polymerization of MPD and TMC without $NaHCO_3$. The structure 19 is a cross-linked polyamide thin film layer with nano-sized pores formed by the release of $CO_2$ generated by $NaHCO_3$.

Example 2

The method of fabricating a substrate is the same as with Example 1.

To fabricate a thin film composite membrane, CuO nanoparticles were added into the 1,3-phenylendiamine (MPD) aqueous solution with a concentration of 2.0 wt. %, wherein the concentration of CuO in the MPD aqueous solution is 0.5 wt %. The aqueous solution was poured on the top surface of a polysulfone substrate and allowed to soak for 2 min. Afterward, the excess MPD aqueous solution was carefully removed from the membrane surface with a rubber roller. Then, a 1,3,5-benzenetricarbonyl trichloride (TMC) hexane solution with a concentration of 0.2 wt. % was gently poured onto the MPD-soaked membrane substrate for 2 min, which formed a thin film via interfacial polymerization. Afterward, the hexane solution was drained and the membrane was put in warm water at 50° C. for 10 min and treated with HCl (pH=3.5) for 2 hours. Finally, the membrane was stored in deionized water pending a performance test.

Example 3

The method of fabricating a substrate is the same as with Example 1.

To fabricate a thin film composite membrane, $N_2$ or $CO_2$ was pressured into the 1,3-phenylendiamine (MPD) aqueous solution with a concentration of 2.0 wt. % at 4 bar in a period of 0-2 h. The aqueous solution was poured on the top surface of a polysulfone substrate and allowed to soak for 2 min. Afterward, the excess MPD aqueous solution was carefully removed from the membrane surface by rolling with a rubber roller. Then, a 1,3,5-benzenetricarbonyl trichloride (TMC) hexane solution with a concentration of 0.2 wt. % was gently poured onto the MPD-soaked membrane substrate for 2 min, which formed a thin film via interfacial polymerization. Afterward, the hexane solution was drained and the membrane was put in warm water at 50° C. for 10 min. Finally, the membrane was stored in deionized water pending a performance test.

Example 4

The method of fabricating a substrate is the same as with Example 1.

To fabricate a thin film composite membrane, 1,3-phenylendiamine (MPD) aqueous solution with a concentration of 2.0 wt. % was subjected to ultrasound (0.33 W/cm$^2$) for 0-2 hours. The aqueous solution was poured on the top surface of polysulfone substrate and allowed to soak for 2 min. Afterwards, the excess MPD aqueous solution was carefully removed from the membrane surface by rolling with a rubber roller. Then, a 1,3,5-benzenetricarbonyl trichloride (TMC) hexane solution with a concentration of 0.2 wt. % was gently poured onto the MPD-soaked membrane substrate for 2 min, which formed a thin film via interfacial polymerization. Afterwards, the hexane solution was drained and the membrane was put in warm water at 50° C. for 10 min. Finally, the membrane was stored in deionized water pending a performance test.

The additive (e.g., salts of bicarbonate, carbonate) used in the present invention is cheap and abundant. The method of preparing the membrane is simple and effective. With only small amounts of additive the improvement is remarkable.

The various thin films prepared by the methods of Examples 1-4 (NaHCO$_3$, CuO nanoparticles, N$_2$, CO$_2$ and with ultrasound) were subjected to various tests, including permeability and salt rejection. Results of the tests are shown in FIGS. 2-6.

FIG. 2A is a bar chart of water permeability of polyamide thin film composite reverse osmosis membranes prepared using various NaHCO$_3$ concentrations in 2.0 wt. % MPD aqueous solution tested at 16 bar and 25 degrees centigrade with feed solution of 2000 ppm NaCl. FIG. 2B is a bar chart of salt rejection of the polyamide thin film composite used in FIG. 2A. FIG. 2A shows that the permeability increases for concentrations of NaHCO$_3$ from zero up to 6 (wt. %). For a concentration of 8 (wt. %), it decreases, showing that the relationship has a peak. Further, acid treatment for 2 hours increased the permeability for all concentrations.

In terms of salt rejection FIG. 2B shows a relatively stable rejection percentage for concentrations of NaHCO$_3$ from zero up to 8 (wt. %), with a modest peak between 2 and 6. However, acid treatment at zero significantly reduces the salt rejection; but at higher concentrations it has a small and non-uniform effect.

FIG. 3 is a bar chart of water permeability (Flux in L/(m$^2$ h)) and salt rejection percentage for polyamide thin film composite reverse osmosis membranes tested at 16 bar and 25 degrees centigrade with a feed solution of 2000 ppm NaCl. The first bar is for a film made by a prior art method used as a control. The second bar illustrates film prepared using CuO nanoparticles as an additive. The third and fourth bars are for films made with pressured N$_2$ and CO$_2$ in 2.0 wt. % MPD aqueous solution. The fifth and sixth bars represent films made with ultrasound of MPD aqueous solution for 30 minutes and 120 minutes. As FIG. 3 shows, the best performance is for CuO nano-particles. However, good results are achieved with CO$_2$ and ultrasound.

Figure 4:
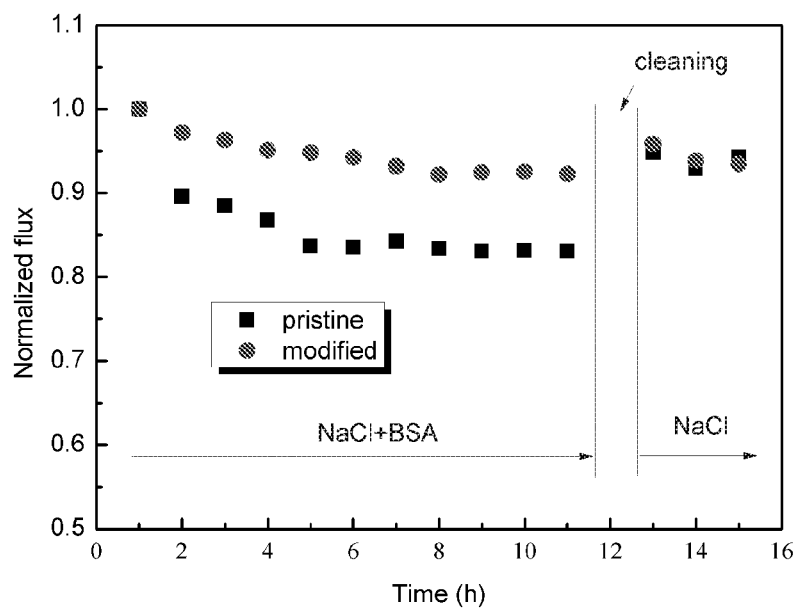
FIG. 4 is a graph showing the variation of normalized fluxes of polyamide thin film composite reverse osmosis membranes with and without $NaHCO_3$ as an additive tested at 16 bar and 25 degrees centigrade with 100 ppm bovine serum albumin (BSA) in the feed solution of 2000 ppm NaCl.

FIG. 4 is a graph of the variation of normalized fluxes of polyamide thin film composite reverse osmosis membranes with ("modified", wherein the concentration of NaHCO$_3$ in MPD aqueous solution is 6.0 wt %) and without NaHCO$_3$ ("pristine") as an additive and tested at 16 bar and 25 degrees centigrade with 100 ppm bovine serum albumin (BSA) in the feed solution of 2000 ppm NaCl. As illustrated in FIG. 4, the results of the modified membranes are superior.

Most membranes will result in flux reduction because of Bovine Serum Albumin (BSA) adsorption. However, the flux reduction can be recovered by cleaning with water. FIG. 4 shows that the membrane of the present invention can be kept at a high level of flux, even with the presence of BSA aqueous solution.

FIG. 5A is an SEM image of polyamide thin film composite reverse osmosis membranes without NaHCO$_3$ (the control one), FIG. 5B is an AFM image thereof, FIG. 5C is an SEM image of polyamide thin film composite reverse osmosis membranes with 6.0 wt % NaHCO$_3$ as additive and FIG. 5D is an AFM image thereof. As can be seen, the addition of NaHCO$_3$ produces a belt-like surface structure membrane.

FIG. 6A and FIG. 6B are a series of four cross-section and four top surface TEM images, respectively of a control film and polyamide thin film composite reverse osmosis membranes according to the present invention with different concentrations (0.5, 6.0 and saturated) of NaHCO$_3$ in MPD aqueous solution. The cross sectional views of FIG. 6A show a film made by a prior art method used as a control and polyamide thin film composite reverse osmosis membranes according to the present invention with 0.5 wt. %, 6.0 wt. % and a saturated concentration of NaHCO$_3$ in MPD aqueous solution. The top surface images of FIG. 6B show a film made by a prior art method used as a control and polyamide thin film composite reverse osmosis membranes according to the present invention with 0.5 wt. %, 6.0 wt. % and a saturated concentration of NaHCO$_3$ in MPD aqueous solution. It is clearly a nano-foamed polyamide layer was formed for the polyamide reverse osmosis membrane after NaHCO$_3$ addition, which is benefit for water permeability due to the reduction of the effective transmembrane thickness. On the other hand, the selectivity of the polyamide membrane with NaHCO$_3$ addition was not sacrificed, breaking the long-standing permeability-selectivity tradeoff in reverse osmosis desalination membrane.

The polyamide thin film composite reverse osmosis membranes without NaHCO$_3$ used in the tests shown in FIGS. 2A-B (0.0 wt % NaHCO$_3$), 4 (pristine), 5A-B and the control film used in the testes shown in FIGS. 3 and 6A-B are prepared by the same method as in Example 1, except that no NaHCO$_3$ is added during the preparation.

While the present invention has been particularly shown and described with reference to preferred embodiments thereof; it will be understood by those skilled in the art that various changes in form and details may be made therein without departing from the spirit and scope of the invention.

The invention claimed is:

1. A method of fabricating a thin film composite membrane, comprising the steps of:
adding a certain amount of NaHCO$_3$ in a 1,3-phenylenediamine (MPD) aqueous solution, wherein the concentration of NaHCO$_3$ in the MPD aqueous solution is in the range from 0.01 wt % to a saturated concentration;
pouring the MPD aqueous solution on the top surface of a polysulfone substrate and allowing it to soak for 10 seconds-5 hours;
carefully removing the excess MPD aqueous solution from the membrane surface by rolling it with a rubber roller;
pouring a 1,3,5-benzenetricarbonyl trichloride (TMC) hexane solution with a concentration of 0.0005-2.0 wt.

% onto the MPD-soaked membrane substrate to get a reaction in 5 seconds-30 min, so that a thin film is formed via interfacial polymerization;

draining the hexane solution from the thin film membrane;

placing the membrane in warm water at 25-80 degrees centigrade for 10-30 min; and treating the membrane with an HCl solution for 2-48 hours.

2. The method of fabricating a thin film composite membrane according to claim 1 further including the step of storing the membrane in deionized water.

3. The method of fabricating a thin film composite membrane according to claim 1 further including the step of adding $NaHCO_3$ during interfacial polymerization.

4. The method of fabricating a thin film composite membrane according to claim 1 wherein the HCl has a pH of about 3.5.

5. The method of fabricating a thin film composite membrane according to claim 1 wherein the polysulfone substrate is fabricated by the steps of:

dissolving polysulfone (PSf) beads in N,N-Dimethylformamide (DMF) at 50° C. until homogeneous and transparent in order to form a polymer solution with a concentration of 15.0 wt. %;

using the polymer solution as a casting solution to prepare a porous substrate;

cooling the casting solution down to room temperature;

degassing the casting solution statically in the same container;

spreading the casting solution directly onto a smooth and clean glass plate with a certain thickness determined by a casting knife; and immersing immediately the glass plate with the whole composite in deionized water as a coagulant bath at room temperature for at least 5 min to finish the phase inversion to form the polysulfone substrate.

6. The method of fabricating a thin film composite membrane according to claim 5 wherein the polysulfone substrate is stored in deionized water prior to having the MPD aqueous solution poured on its top surface.

7. A method of fabricating a thin film composite membrane, comprising the steps of adding additives in a reaction system, introducing reactions to release gases in a reaction system, using solutions with supersaturated gases in a reaction system, pressuring soluble gases in a reaction system, altering temperature or pH of a reaction system, using ultrasound on a reaction system, or using a nano-bubble generator in a reaction system; wherein the reaction system is a 1,3-phenylenediamine (MPD) aqueous solution with a concentration of 0.01~10.0 wt. %;

pouring the MPD aqueous solution on the top surface of a polysulfone membrane substrate and allowing it to soak for 10 seconds-5 hours;

carefully removing the excess MPD aqueous solution from the membrane surface by rolling it with a rubber roller;

pouring a 1,3,5-benzenetricarbonyl trichloride (TMC) hexane solution with a concentration of 0.0005-2.0 wt. % onto the MPD-soaked membrane substrate to get a reaction in 5 seconds-30 min, so that a thin film membrane is formed via interfacial polymerization;

draining the hexane solution from the thin film membrane;

placing the thin film membrane in warm water at 25-80 degrees centigrade for 10-30 min; and treating the thin film membrane with an HCl solution for 2-48 hours to form the thin film composite membrane.

8. The method of clam 7 wherein the additives are salts of bicarbonate, carbonate, CuO nano-powder/nanoparticles, or pure metals (e.g., zero valent iron).

9. The method of clam 7 wherein the additives will 1) decompose or react with at least one reactant or at least one product during reaction, or 2) be dislodged by post-treatment, or 3) release volatile vapor(s) to generate nano-sized bubbles.

10. The method of claim 7, wherein the interfacial polymerization process for preparing a thin film composite membrane, comprises:

a) an aqueous solution containing at least an amine, b) an organic solution containing at least a polyfunctional acyl halide, and wherein interfacial polymerization of a) and b) occurs at or near the surface of the membrane substrate.

11. The method of claim 10 wherein the porous support membrane is polysulfone (PSf), polyethersulfone (PES), polyvinyl chloride (PVC), polyacrylonitrile (PAN), polycarbonate, polyphenylene oxides, poly(styrene-co-acrylonitrile), poly(phthalazinone ether sulfone ketone) (PPESK), polyetherimide or polypropylene.

12. The method of claim 7 wherein the thin film composite membrane is for use in reverse osmosis (RO), nanofiltration (NF), forward osmosis (FO), pressure retarded osmosis (PRO), or chemical applications (e.g., batteries, fuel cells).

13. The method of fabricating a thin film composite membrane according to claim 1 wherein the concentration of MPD in the MPD aqueous solution is in the range of 0.01~10.00 wt. %.

14. The method of claim 10 wherein the porous support membrane is made by a phase inversion technique.

* * * * *